Patented Feb. 8, 1949

2,460,988

UNITED STATES PATENT OFFICE 2,460,988

WELDING FLUX

Kenneth H. Koopman, Kenmore, N. Y., assignor to Union Carbide & Carbon Corporation, a corporation of New York No Drawing. Application October 27, 1945, Serial No. 625,112

5 Claims. (Cl. 148—26)

This invention relates to welding fluxes and has particular reference to fluxes for use in welding ferrous alloys containing substantial proportions of chromium.

Chromium in its alloys is readily oxidized when such alloys are molten, and the products of its oxidization are extremely refractory. This characteristic of chromium makes the welding of chromium-containing alloys rather difficult from the standpoint of producing a clean deposit of metal. The refractory oxides formed tend to insulate the work, and the operator must take every precaution to restrict the formation and entrapment of oxides in the weld metal. The use of a welding flux having a high solvent power for chromium oxides is essential to the production of sound, clean welds of good appearance.

The requirements for a satisfactory welding flux for use in the fusion-deposition welding of chromium alloys are in general the properties required of all welding fluxes. For example, the flux when molten must have a high solvent power for the oxides formed during the welding operation, the surface tension of the molten flux should be sufficiently low to ensure that the flux will spread over the welding puddle and the base metal in the welding zone, the molten flux should be fluid, but not so fluid that it will run out of the welding zone, and the melting point relationship between the metal being welded and the flux should be such that the above-mentioned surface tension and viscosity conditions are obtained without overheating either the filler metal or the work being welded.

In attempts to satisfy these requirements, the fluxes hitherto recommended for use in the welding of chromium alloys have contained large proportions of fluorides, such as calcium fluoride, or boron compounds, such as borax, or both. Fluxes of either type are quite effective in dissolving or reacting with chromium oxides and have the requisite fluidity, but they suffer from rather serious disadvantages. Fluxes containing large quantities of fluorides tend to emit toxic fumes in use which constitute a decided health hazard to the operator. Welding fluxes containing large proportions of boron compounds have the disadvantage that the weld metal may be contaminated with excessive quantities of boron from the flux. The introduction of more than a very small quantity of boron to the weld metal causes embrittlement of the weld metal.

It is an object of the present invention to provide a welding flux having improved fluxing power and welding qualities and particularly suited for use in the fusion-deposition welding of ferrous alloys containing substantial proportions of chromium. Another object of the invention is to provide such a flux which is non-fuming during use. A further object is a flux which during use does not contaminate the weld metal with excessive quantities of boron.

These objects are achieved by the present invention which comprises a flux composition containing about 5% to 15% borax glass; 5% to 15% titanium dioxide; 5% to 15% lime (calcium oxide); 25% to 40% sodium carbonate; the remainder substantially all silica, the silica content being about 25% to 40%. A suitable source of titanium dioxide is rutile. A specific example of the invention is a welding flux containing about 11.5% borax glass; 11% titanium dioxide; 11% lime; 33% sodium carbonate; and 33.5% silica.

If desired, all of the calcium oxide in the flux composition and a part of the silica may be added as calcium silicate (CaSiO₃). The percentage of calcium silicate required in the composition to provide a desired porportion of calcium oxide in the flux may be determined from the formula:

$$\frac{\text{Molecular weight CaSiO}_3}{\text{Molecular weight CaO}} \times \%\text{CaO} = \%\text{CaSiO}_3$$

For example, to supply the 11% calcium oxide present in the specific flux composition above described, the composition may contain 22.8% calcium silicate. This not only provides all of the desired calcium oxide, but also supplies silica in a proportion of 11.8% of the composition. Free silica may then be added to make up the total 33.5% desired.

The manufacture of the flux of the invention is simple. Borax is fused to eliminate its water of crystallization, and the resultant product, referred to herein as "borax glass," is comminuted, for example to pass a 100 mesh (0.15 mm. openings) screen. The borax glass so prepared is then thoroughly mixed with the proper quantity of the other constituents which are also in finely-divided form.

A mixture prepared as just described has very good characteristics, but a superior product may be prepared by fusing the mixture and then cooling and solidifying it. After solidification, the fusion product is finely ground for example so that 95% will pass through a 200 mesh (0.07 mm. openings) screen. A flux prepared in this way, referred to herein and in the appended claims as a "prefused" flux is a preferred embodiment of the invention. Prefused flux has a smoother, more uniform fluxing action, and no frothing or bubbling is encountered during its use since all gas is evolved and eliminated in the fusion step in its preparation.

The flux of the invention has been thoroughly tested in comparison with commercial fluxes designed for use in welding iron-chromium alloys. These tests indicate that the flux of the invention has a stronger fluxing action than any of the other fluxes tested, and its surface tension and viscosity characteristics are also excellent. In these tests oxides were easily floated to the surface of the molten puddle by the flux of the invention and clean welds free from entrapped particles were produced.

Tests have also been carried out to determine the degree of boron contamination that occurs when the flux of the invention is used compared with the degree of boron contamination occurring using commercial fluxes. In one of such tests two welds were prepared under identical conditions in stainless steel of the 18% chromium, 8% nickel type, the only difference in procedure being that in making one weld a commercial flux was used and in making the other weld the flux of this invention was used. Chemical analysis of the weld metal showed that it had picked up 0.008% boron when the commercial flux was used, but that when the flux of this invention was used, the weld metal had picked up only 0.0009% boron.

To determine whether or not this difference in boron pick-up was of any significance, additional welds were made in the same material, specimens 1 inch wide and ⅛ inch thick being butt-welded together. Three specimens were prepared using the commercial flux, and three specimens were prepared using the flux of the invention. After welding, the weld reinforcement was ground off and the specimens were bent to failure around a 0.5 inch diameter pin. Failure occurred in each of the three specimens welded with the commercial flux, failure occurring in one specimen when it had been bent 32°, in another at 46° bend and in the third at 120° bend. Each of the specimens prepared using the flux of this invention was bent 180° without failure.

Corrosion tests were also made on weld metal of welds produced using, in one case, the commercial flux and in the other the flux of the invention. These tests indicated that there is no significant difference in the corrosion resistance of welds using either flux.

In utilizing the flux of this invention, conventional methods for introducing the flux to the weld zone may be followed. For example, the hot welding rod may be dipped periodically as required into the finely-divided flux, which adheres well to the rod, or a slurry of flux and water or alcohol may be applied to the rod or the work or both. In making the tests described herein a prefused flux was used and was applied to the work and the filler rod as a slurry of flux and water.

I claim:

1. A flux composition comprising 5% to 15% borax glass; 5% to 15% titanium dioxide; 5% to 15% calcium oxide; 35% to 40% sodium carbonate; the remainder essentially all silica, the silica content being 35% to 40%.

2. A welding flux composition consisting essentially of 11.5% borax glass; 11% titanium dioxide; 11% lime; 33% sodium carbonate and 33.5% silica.

3. A prefused welding flux composed of the fusion product of a mixture comprising 5% to 15% borax glass; 5% to 15% titanium dioxide; 5% to 15% calcium oxide; 25% to 40% sodium carbonate; the remainder essentially all silica, the silica content being 25% to 40%.

4. A prefused welding flux composed of the fusion product of a mixture consisting essentially of 11.5% borax glass; 11% titanium dioxide; 11% calcium oxide; 33% sodium carbonate; and 33.5% silica.

5. In the art of welding ferrous alloys containing substantial quantities of chromium by fusion-deposition methods, the improvement which comprises conducting such fusion-deposition operation under a molten flux composed of the fusion product of a mixture containing 5% to 15% borax glass; 5% to 15% titanium dioxide; 5% to 15% calcium oxide; 25% to 40% sodium carbonate; the remainder essentially all silica, the silica content being 25% to 40%.

KENNETH H. KOOPMAN.

REFERENCES CITED

The following references are of record in the file of this patent:

UNITED STATES PATENTS

| Number | Name | Date |
|---|---|---|
| 1,956,327 | Jerabek | Apr. 24, 1934 |
| 2,150,625 | Jones et al. | Mar. 14, 1939 |

FOREIGN PATENTS

| Number | Country | Date |
|---|---|---|
| 191,436 | Great Britain | Jan. 8, 1923 |
| 77,825 | Switzerland | Oct. 1, 1918 |

Certificate of Correction

Patent No. 2,460,988.                                                                                           February 8, 1949.

KENNETH H. KOOPMAN

It is hereby certified that error appears in the printed specification of the above numbered patent requiring correction as follows:

Column 4, line 14, claim 1, for "35% to 40%" read *25% to 40%*; and that the said Letters Patent should be read with this correction therein that the same may conform to the record of the case in the Patent Office.

Signed and sealed this 21st day of June, A. D. 1949.

[SEAL]

THOMAS F. MURPHY,
*Assistant Commissioner of Patents.*